United States Patent [19]
Green

[11] Patent Number: 4,574,943
[45] Date of Patent: Mar. 11, 1986

[54] CONTROL SYSTEM FOR BOOSTER TYPE BELT CONVEYOR

[75] Inventor: Peter J. Green, Huntington, W. Va.

[73] Assignee: Service Machine Company, Huntington, W. Va.

[21] Appl. No.: 662,830

[22] Filed: Oct. 19, 1984

[51] Int. Cl.[4] .............................................. B65G 43/00
[52] U.S. Cl. ................................... 198/810; 198/833; 192/0.098; 192/48.8; 318/102
[58] Field of Search ............... 198/833, 575, 322, 810, 198/855, 330, 832, 834, 835; 318/50, 102; 192/0.098, 48.8

[56] References Cited

U.S. PATENT DOCUMENTS

| | | | |
|---|---|---|---|
| 2,586,782 | 2/1952 | Buckeridge | 198/575 |
| 2,732,059 | 1/1956 | Erisman | 198/833 |
| 2,735,537 | 2/1956 | Keller | 198/833 X |
| 2,759,595 | 8/1956 | Lavenstein | 198/833 X |
| 2,863,555 | 12/1958 | Jaritz | 198/833 |
| 3,268,065 | 8/1966 | Thomson | 198/833 |
| 3,317,802 | 5/1967 | Ogden | 318/102 |
| 3,710,214 | 1/1973 | Anderson | 318/102 |
| 3,858,473 | 1/1975 | Bystron | 83/401 |
| 3,869,574 | 3/1975 | Kume | 198/833 |
| 3,994,390 | 11/1976 | Peterson, Jr. et al. | 198/833 |
| 4,363,399 | 12/1982 | Ludwig et al. | 198/833 |

FOREIGN PATENT DOCUMENTS 1138356 10/1962 Fed. Rep. of Germany .
2241193 8/1972 Fed. Rep. of Germany .
863911 2/1959 United Kingdom .

*Primary Examiner*—Joseph E. Valenza
*Assistant Examiner*—Jonathan D. Holmes
*Attorney, Agent, or Firm*—McCaleb, Lucas & Burgman

[57] ABSTRACT

A control system for a booster type belt conveyor having one or more booster belts spaced at intervals along a conveyor belt with the upper, driving run of each booster belt frictionally engaging the underside of the conveyor belt carrying run. Each belt has a driving pulley connected to a driving unit including one or more electric motors, engageable and disengageable fluid couplings, and a gear box. The conveyor is for heavy duty service, in long lengths of several miles. There is an electrical control assembly for each drum or pulley driving unit. These automatically start the motors in sequence while the couplings are disengaged, each being started in response to a signal from a previously started motor that it has reached running speed. An electrical loop interconnects all the control assemblies and contains relays which, when the loop is energized to actuate the relays, cause the fluid couplings to engage. The electrical loop is conditioned responsive to a running condition signal from the last-started motor, and is then energizable by a switch to engage all the fluid couplings and cause the motors to rotate the drive pulleys.

17 Claims, 8 Drawing Figures

CONTROL SYSTEM FOR BOOSTER TYPE BELT CONVEYOR

BACKGROUND OF THE INVENTION

This invention relates generally to belt conveyors and particularly to heavy duty mining and industrial type conveyors characterized by a very long conveying run extending in a single reach with one or more frictionally engaged auxiliary booster drive belts augmenting the head end conveyor drive.

Belt type conveyors are widely used for example in moving coal and ore, both underground from the face to a cleaning and sizing operation, and aboveground from the mine to a loading point. Even in underground applications, some of these are miles long.

There are three general types of these long belt conveyors: 1. cascade; 2. cable belt; and 3. booster type belt.

Cascade conveyors are a series of individual, separately powered conveyors arranged in "cascade" relationship, with one discharging onto another. Although extensively used in the past for conveyors longer than were practical for a single length of conveyor belt, they have several drawbacks including degradation of conveyed material and dust generation at each transfer point, and, when used underground, they require extra brushing to remove overhead rock at transfer points.

Cable belt conveyors have a belt supported between a pair of moving steel cables. Although adaptable to very long lengths of many miles, they are complex, expensive, not easily extended, and require substantial head room limiting their use underground.

Booster type belt conveyors are relatively new, the first believed developed for heavy duty use in a British coal mine about 1976 by Hu Wood, Limited. It was originated as a means of uprating an existing half-mile-long conveyor, but did not address problems of applying the booster concept from the outset as a means of providing a long distance transport system which could be extended to a length of several miles as needed.

The booster type belt conveyor offers economic and operational advantages for materials handling over long distances both underground and aboveground. It comprises a conveyor belt having conveyor and return runs trained for orbital movement between driving and idler pulleys located respectively at head and tail ends. One or more intermediate booster belts are trained for orbital movement between driving and idler pulleys with their driving runs in frictional driving engagement with the upper, carrying run of the conveyor belt. Drive motors are connected to the driving pulleys.

In a typical coal mining operation, a booster type belt conveyor may initially be a few hundred or a few thousand feet long. As it is extended, for example, to follow an advancing mine face, it may become several miles long with booster drive belts spaced apart at intervals of a mile or so. Starting such a long conveyor involves many problems. The motor or motors in each driving unit will often require hundreds of horsepower and the booster driving units will be located beyond the sight and hearing of the operator at the main control station. Because the motors take six or more times full load current to start from rest, the power to start all the motors at once could place an unacceptable load on an electrical power source.

Sequential starting is therefore essential. This however can introduce localized stretching of the conveyor belt at the driving point, and severe stress differentials on opposite sides of the drive pulley. This can produce an undesirable "ripple" or wave effect moving along the conveyor as one driving unit after another is powered, and require special, costly, high tensile strength belting, and complex, costly, takeup loop structures for absorbing surplus or stretched belting.

SUMMARY OF THE INVENTION

Because the driving pulleys are widely separated and may be as much as a mile apart, the electrical control and coordination of the complete conveyor poses some unusual problems.

A general object of the present invention is to provide in a booster type belt conveyor an improved electrical control system for sequentially starting the drive motors and then coupling them to the driving pulleys or drums in a timed sequence in a progressive manner.

An important objective of the present invention is to provide overall control of a booster conveyor system in a manner which is reliable, safe and economic. In practical terms this means sequenced starting of the motors, under conditions where it is safe to do so, followed by synchronized or time related operation of the couplings to tension the conveyor belt progressively to insure smooth, uniform acceleration along the carrying run of the belt. It is also necessary to have a means of stopping the conveyor by the simultaneous removal of power from the separate drives, either in normal operation or because of some hazardous development or occurrence at one of the drive stations.

Because of the length of the conveyor, the expense of multi-conductor cables running between drive stations is a serious consideration in the economic evaluation of a booster conveyor system. The present invention seeks to minimize cabling costs by reducing the required number of conductors to four, of a relatively small gauge, while at the same time using simple circuits which are easy to understand and maintain.

Another object is to provide, in a booster type belt conveyor having a pulley driving unit with electrical motor means for each driving pulley, an improved electrical starting and control system comprising: engageable and disengageable coupling means in each driving unit between the corresponding motor means and driving pulley or drum; a plurality of control assemblies, one for each driving unit; means in each control assembly for sensing a running condition of the corresponding motor means and generating a running condition signal in response thereto; means effective after a first motor means has been started for automatically sequentially starting each of the remainder of the motor means in response to a running condition signal from a previously started motor means; a coupling-controlling electrical loop common to all of the control assemblies; a plurality of electrically energizable, coupling actuating means in the loop, one for each control assembly, each effective when energized to engage the corresponding coupling means; and means responsive to the running condition signal from the last motor means started to connect the electrical loop to an electrical power source and thereby condition the loop to engage all of the couplings.

Another object is to provide a switch in the electrical loop for energizing the coupling actuating means after the loop has been conditioned as stated above.

Another object is to provide, in the control assembly for each one of the motor means except the last to be started, a motor starting circuit including: a relay responsive to a running condition signal from said one motor means to connect an electrical power source to a motor starting relay in the control assembly for the next of the motor means started; and a coupling engaging circuit including part of an electrical loop common to the control assemblies for all the motor means, the coupling-engaging circuit having a relay responsive to electrical energization of the loop, when the last motor means is started, to engage the coupling means for said one motor means.

Another object is to provide, in the control assembly for the last motor means started, means to condition the above-described electrical loop for energization including a relay responsive to a running condition signal from said last motor means started to connect an electrical power source to the electrical loop; and a coupling-engaging circuit including part of the electrical loop having a relay responsive to electrical energization of the loop to engage the coupling means for said last motor means started.

Another object is to provide in one of the control assemblies a switch controlling energization of the electrical loop to simultaneously actuate the relays controlling engagement of the couplings.

BRIEF DESCRIPTION OF THE DRAWINGS

Other objects and advantages will be apparent from the following description taken with the accompanying drawings in which

FIGS. 2 and 3 are simplified circuit diagrams of the system shown in FIG. 1;

FIG. 4 is a schematic illustration showing the relationship of FIGS. 2 and 3; and FIGS. 5, 6, 7 and 8 are modifications of the FIG. 2 circuit diagrams for use with three booster belts, two booster belts, one booster belt, and the main belt alone, respectively.

Like parts are referred to by like reference characters.

DESCRIPTION OF THE PREFERRED EMBODIMENTS

Figure 1:
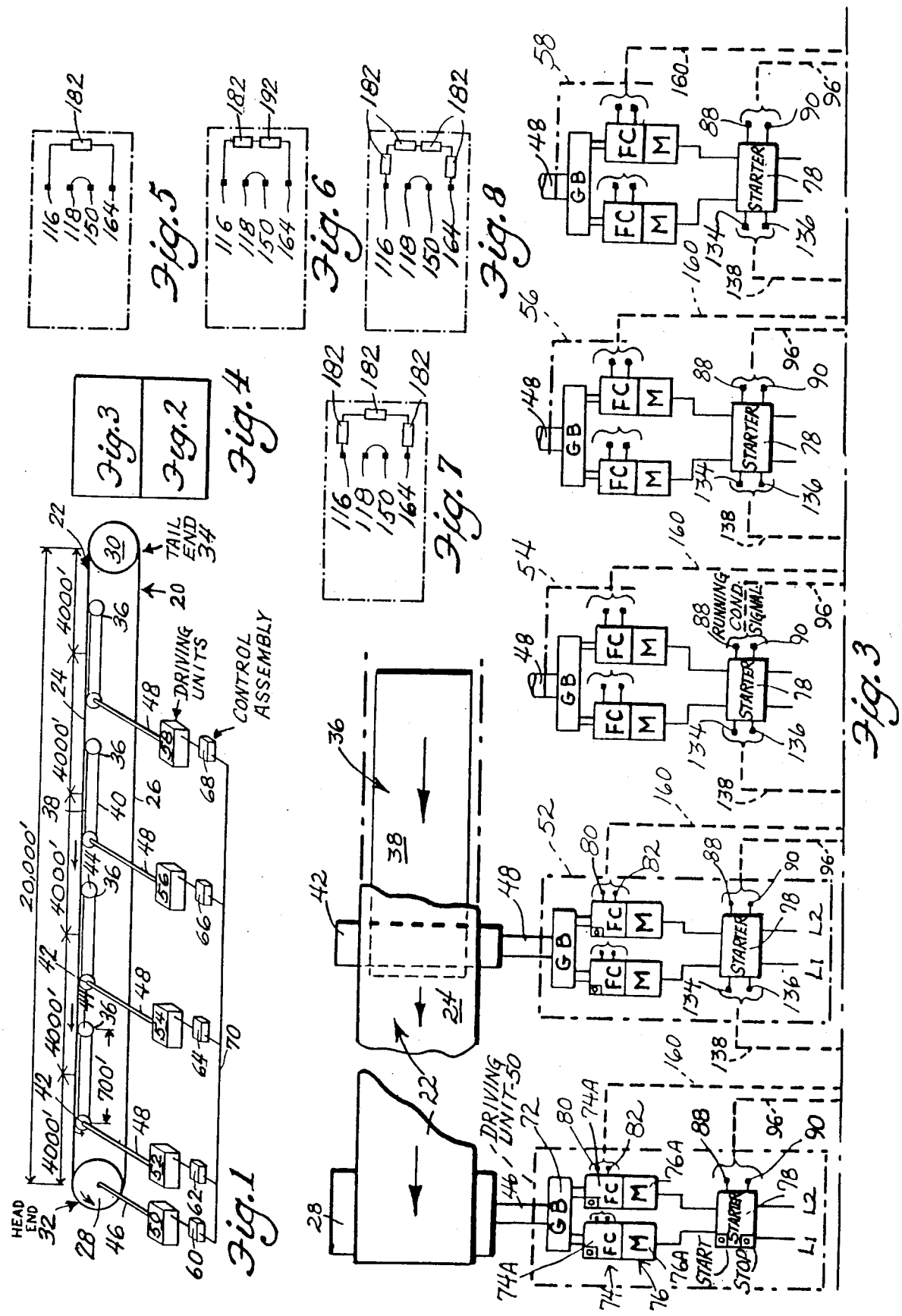
FIG. 1 is a diagrammatic representation of a booster type belt conveyor system illustrating one form of the present invention.

Referring now to the specific embodiment of the invention shown in the drawings, a booster type belt conveyor generally designated 20 is diagrammatically shown in FIG. 1. It comprises a main conveyor belt 22 having conveying and return runs 24 and 26 trained for orbital movement between drive head and return end drums 28 and 30 located respectively at head and tail ends 32 and 34. The conveying or carrying run will preferably have a troughed configuration (not shown) for heavy duty mine service and the like, and both runs will be supported on conventional troughing and return rollers (not shown).

A plurality (in this case four) of booster belts 36 are located intermediate the conveyor belt drive head and return end drums. Each booster belt has driving and return runs 38 and 40 trained for orbital movement between drive head and return end drums 42 and 44, with each driving run in frictional driving engagement with the underside of the conveyor carrying run 24. As an indication of scale, one specific prototype on which this description is based is 20,000 feet long, the booster belts are 700 feet long spaced on 4,000-foot centers, and the conveyor and booster belting are reinforced rubber-like materials about 42" wide.

The conveyor drive head drum 28 and the booster drive head drums 42 are connected by drive shafts 46 and 48 to drum driving units 50, 52, 54, 56 and 58 respectively. These are located at control assemblies 60, 62, 64, 66 and 68 respectively, and interconnected by a cable 70 to integrate the individual control assemblies into a unitary, cooperative system. The drum driving units 50–58 are illustrated as identical except for addition of start and stop buttons on starter 78 in driving unit 50. Each unit comprises a gear box 72 with output drive shaft 46 or 48. Each unit has electrically engageable and disengageable coupling means 74 and electric motor means 76 controlled by a starter 78. Although a single, larger coupling, and a single, larger motor could be used, they are arranged in pairs in the specific prototype described. Each motor means is here shown comprising two individual, 250-horsepower induction motors 76A, 76A. While any suitable electrically operated coupling means may be used, the specific coupling means 74 used in the prototype described comprises two electrically controllable fluid couplings 74A, 74A, known in the trade as "scoop controlled fluid couplings" and are available in a wide variety of horsepower and speed ratings. They are externally electrically controllable in that they engage or close to a selected degree when terminals 80 and 82 are interconnected. The control assemblies 60–68 will preferably be provided in readily replaceable module form to facilitate installation and maintenance of the system.

The internal workings of the motors, couplings and starters form no part of this invention so will not be described in detail. While, in practice, the entire system will be completely controlled and monitored by computer means, not shown, relatively simple controls are illustrated to facilitate a description and understanding of the invention. The starters 78 are substantially identical, except that the starter for the main conveyor 60 has "start" and "stop" buttons while those in the booster control assemblies are actuated automatically through input terminals 134, 136. Each starter, irrespective of the actuating means, starts the corresponding pair of motors 76A sequentially in a conventional manner and energizes starter output terminals 88, 90 to place a running condition signal across terminals 92, 94 in the corresponding control assembly, via a connecting cable 96, to indicate that the corresponding pair of motors have been brought up to proper running speed.

The control assemblies 60–68 are generally similar in that each has a motor-starting circuit generally designated 98 and a coupling-engaging circuit 100 consisting of a portion of an electrical loop generally designated 102. The loop extends the entire distance between the main Type A control assembly 60 and the last Type B booster control assembly 68 via conductors 174, 176 which will be described.

In the main control assembly 60, the motor-starting circuit comprises a power source consisting of an isolation transformer 104 and a relay 106. Transformer input terminals 108, 110 are connected to a conventional 120-volt alternating current control circuit supply. The relay has a coil 112 with terminals 92, 94 connected through cable 96 to output terminals 88, 90 of the corresponding starter 78. The transformer output is connected through relay contacts 114 to output terminals 116, 118. This is repeated in each of the booster control assemblies 62, 64, 66 and 68.

In addition, the motor starting circuit for each of the booster control assemblies has a relay 120 with a coil 122 between input terminals 124, 126, and contacts 128 between output terminals 130, 132, the latter being connected to corresponding starter input terminals 134, 136 via a connecting cable 138.

Turning attention now to the coupling-engaging control circuit 100, this comprises the pair of conductors 174, 176 connected at the far end via jumpers 178, 180 to terminals 116, 118 in the last booster control assembly 68. They extend all the way across the control assemblies (in cable 70) back to the main control assembly 60 where they are interconnected by jumper 140.

Figure 2:
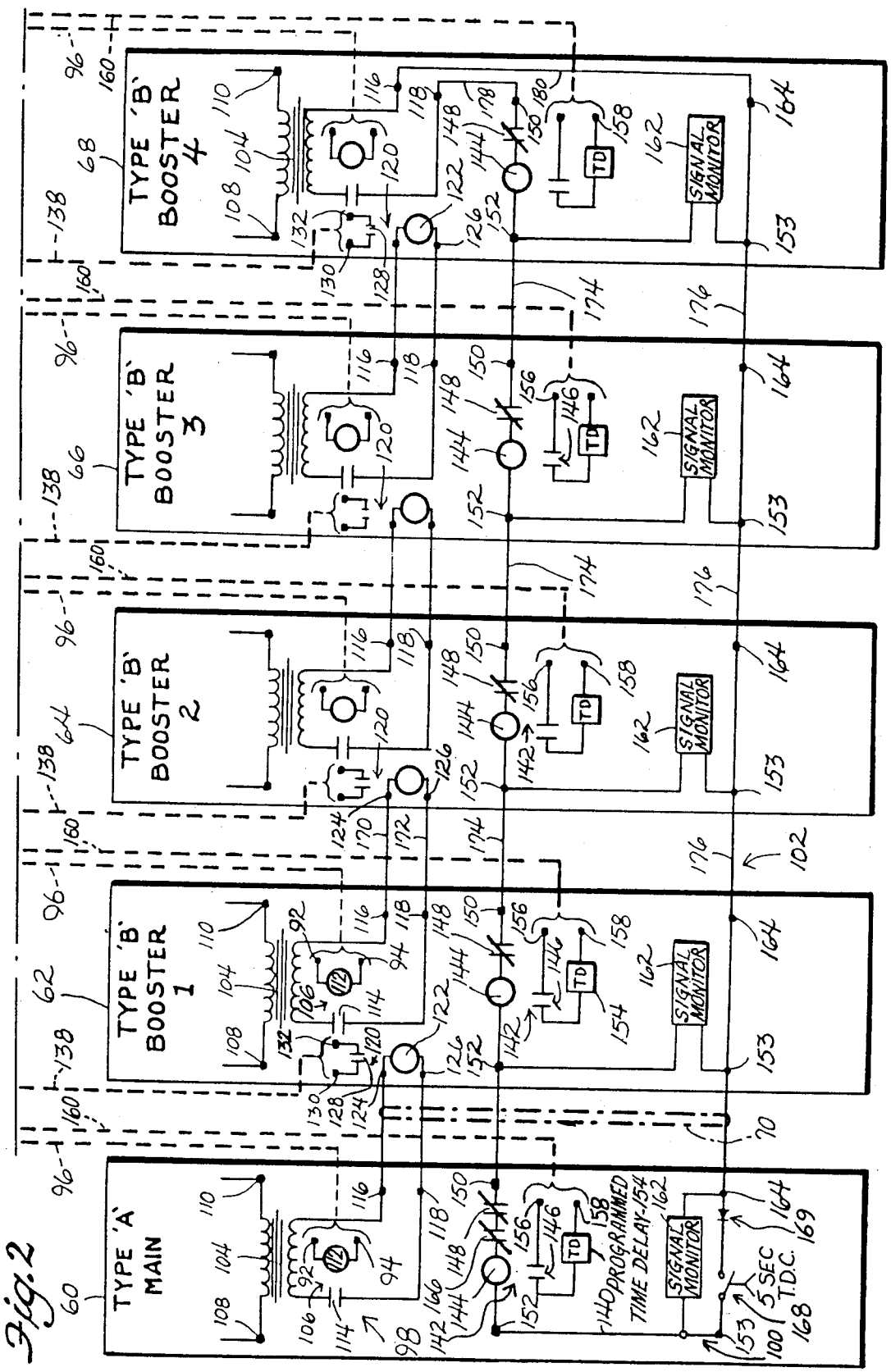

Portions of the circuit 100 in the individual control assemblies will now be described. The main control assembly 60 and each of the booster control assemblies 62, 64, 66 and 68 has a relay 142 with a coil 144 and contacts 146. The coil 144 in each of the main and booster control assemblies is in series with contacts 148 between terminals 150, 152. In addition, the main control assembly 60 has contacts 166 between the respective contacts 148 and coil 144. Contacts 146 and a programmable time delay unit 154 are connected between a pair of terminals 156, 158, these being connected to corresponding fluid coupling terminals 80, 82 via a connecting cable 160. A signal monitor comprising a high input impedance voltage detector 162 is connected across terminals 152, 153 in opposite legs of the loop 102 in each booster control assembly. In the main control assembly it is connected between terminals 153 and 164, a terminal 164 being provided in one of the legs of each control assembly as shown in FIG. 2. Safety switch means including safety contacts 148 in each of the control assemblies are the master contacts for all automatic or manually operated safety devices (not shown) associated with each driving unit. Contacts 148 are repeated in all the control assemblies. These are normally open but under safe conditions they will be closed. In the main control assembly 60 contacts 166 are associated with relay means (not shown) which stops the conveyor belts 22 at times when an outbye tipple, conveyor, or railway car, which normally receives material, is inoperable.

In addition to the above components which are common to the loop 100 in all the control assemblies, the main control assembly 60 has a coupling control switch 168 and rectifying means, namely a diode 169, in parallel with the signal monitor 162.

It will be understood that the coupling control switch 168 and rectifier diode 169 are not necessarily physically within the main control assembly 60. The motor starters are usually located as near to the motors as practicable, but the first driving unit (50 in this case) may be 200 feet or so back from the delivery end of the conveyor. In such cases, it is convenient to mount the coupling control switch 168, rectifier 169, and associated signal monitor 162 near the delivery end of the conveyor where an operator would be stationed to watch material being discharged from the conveyor. Positioning the rectifier as near to the switch as practicable provides maximum protection against dangerous maloperation due to a short in the control circuit.

Because of the length of the conveyor, the multiconductor cable 70 may extend as much as a mile between control assemblies. Cable cost therefore can be a serious consideration in the economic assessment of any booster conveyor system. The present invention minimizes cabling costs by reducing the number of conductors required to four, namely those numbered 170, 172, 174 and 176 between control assemblies. These may be light conductors in the order of 14-gauge. The fact that the system requires only four conductors between control assemblies has a further advantage by enabling use of the well-known "quad" cable relationship. Thus conductors 170 and 172 are selected to be diametrically opposed, likewise conductors 174 and 176 are diametrically opposed in the four conductor cable. This configuration ensures that the inductive coupling between the separate circuits is negligible.

The complete loop circuit involving all four control assemblies and booster drives as shown in FIGS. 2 and 3 may be several miles long, approximately four miles in the present example. The conductor cross section initially selected for the loop 100 should be suitable for the maximum specified distance to which the conveyor would eventually be extended. In the early stages of development, when there are less than the maximum number of booster drives in service and the installed loop length is less than the maximum, it is necessary to compensate for the reduced impedance of the circuit by adding selected values of resistance. The resistor values for the various reduced lengths of conveyor are shown in FIGS. 5, 6, 7 and 8. For example, as shown in FIG. 2, where all four booster drives are used in the present example, jumpers 178 and 180 will interconnect terminals 118, 150 and terminals 116, 164 respectively in the last booster control assembly. Where only three booster drives are used, FIG. 5 shows a single 50-ohm, 100-watt resistor 182 will be substituted for the jumper between terminals 116 and 164. Where there are only two booster drives, FIG. 6 shows two such resistors used in the jumper. Where only one booster drive is used, FIG. 7 shows three such resistors. And where no booster drive is used, FIG. 8 shows four such resistors.

The basic coupling-engaging loop circuit 100 described above has some special features to ensure safe and convenient operation. To prevent inadvertent energization of one or more fluid-coupling-engaging relays 142 due to a short circuit between conductors 174, 176, the relays 142 are of a special design which permits operation on half wave rectified alternating current but not on normal full wave alternating current. While any suitable relay may be used, one such relay which has been successfully used in the present invention is known as a "slugged" relay, in which the iron core carries a heavy "shorted turn" which enables it to function as described. Under normal conditions the series diode 169 provides the half wave rectification required. A short circuit at any point between conductors 174 and 176 will result in all the relays 142 being deenergized thereby disengaging the corresponding fluid couplings and shutting down the conveyor. The signal monitor units 162 provide an effective way of locating an open circuit in the loop. For instance if there is an open circuit fault in conductor 174 between booster control assemblies 64 and 66, the signal monitors at booster control assemblies 66 and 68 will detect the alternating current voltage at the output of the last isolation transformer 104 while the signal monitors at the main control unit 60 and at control assemblies 62 and 64 will not detect an alternating current voltage.

The signal monitor 162 connected across the diode 169 at the main control assembly 60 has a broader application. After the "start" button on the main unit starter 78 has been actuated, the signal monitor 162 will show when all the motors up to and including those in the last booster drive have started and reached proper running speed, so the operator will know when he can actuate coupling control switch 168 to initiate the engagement procedure for the fluid couplings. As noted by the "5 SEC. T.D.C." legend associated with coupling control switch 168, there will preferably be a time delay of five seconds or so in the system between closing of the switch and actual engagement of the fluid couplings to start the conveyor. The particular time delay circuitry is not shown but may be incorporated as a safety feature allowing time for warning sirens and flashing lights to be actuated along the complete length of the conveyor before it starts.

The programmable time delay units 154 represent tension control devices and techniques which may be employed to control conveyor belt tension during start up. Because the conveyor belt may be many miles long, it should not be started by sudden, full engagement of all five pairs of fluid couplings. This would create severe tension gradients on opposite sides of the driving pulleys with very high tensioning behind them and considerable slack ahead of them, and wave-like distortion rippling along the conveying run for an initial period until the tension could equalize. To prevent this and enable the belt to start smoothly without such ripple effect, time delay units 154 may be programmed to energize the fluid couplings in two stages a few seconds apart: an initial stage in which the couplings are only partially engaged to apply limited driving tension to the conveyor belt simulataneously through all five driving pulleys and prevent development of slack in localized portions of the conveying run; followed a few seconds later by full engagement of the fluid couplings to bring the conveyor smoothly up to maximum rated speed.

As stated, the plurality of sets of safety contacts 148 are important to the safe operation of the system. They are normally open, but each set will be part of a relay means (not shown) which will monitor various electrical and mechanical functions in the respective drives and controls. If all functions are safe and proper, the safety contacts 148 will be closed as shown in FIG. 2. If there is any detectable electrical or mechanical defect at any drivehead the related contacts 148 will be opened to prevent the conveyor from starting or to immediately stop it if it is already running. The overall control system is such that, in the latter case, all the couplings 74 are disengaged immediately and simultaneously, to quickly stop the conveyor, no matter where the defect may be located. The signal monitors 162 enable the open contact to be identified and hence the cause investigated.

Starting and stopping procedures will now be described. In general, the electrical motor means are sequentially started beginning with the main conveyor motors in the conveyor driving unit 50 and progressing in a cascade manner inbye along the conveyor to the motor means in the last booster drive unit 58. Each motor means is started only after the previous one is brought up to proper no load running speed. After the motors are running, the fluid couplings are engaged in a suitable progressive manner as described.

To start the conveyor, the "start" button on the main conveyor starter 78 is pressed. By conventional starter cicuitry (not shown) the pair of main motors 76A, 76A will be started sequentially and brought up to no load running speed, it being understood that the fluid couplings 74A, 74A in driving unit 50 will remain disengaged at this time in the absence of a coupling engaging signal in cable 160. At this time, a running condition signal appears on starter output terminals 88, 90 of unit 50 and is communicated through cable 96 to terminals 92, 94 of relay 106 in main control assembly 60. This closes contacts 114 and energizes relay 120 in the first booster control assembly 62 closing contacts 128 therein and transmitting a start signal through cable 138 to the starter in driving unit 52. Relays 120 in successive booster control assemblies are energized in the same way as the separate motor means are brought up to running speed until all five pairs of motors 74A are running. When the last booster motor means, in control assembly 68, reaches running speed, loop 100 is conditioned for energization through jumpers 178 and 180 by the closing of the last set of contacts 114.

At that time, the operator can confirm that all the motors are running by means of signal monitor 162 in main control unit 60. He then presses coupling control switch 168 to energize the loop. After a suitable time delay of 5 seconds or so (by the "T.D.C." means) to provide time for warning signals to be broadcast along the conveyor, then, under control of the programmed time delay units 154, the fluid coupling means will be engaged to bring the conveyor belt 22 up to proper conveying speed.

Stopping procedure for the conveyor is the reverse of the above. As a first step, the couplings are disengaged by opening coupling control switch 168. This stops the belt. Normal shut-down of the motor means is initiated by pressing the "stop" button in the starter of main driving unit 50 which results in an automatic cascade shut-down of the motors, first the main motor means in unit 50 followed one at a time by those in booster driving units 52, 54, 56 and 58.

The embodiments described and shown to illustrate the present invention have been necessarily specific for purposes of illustration. Alterations, extensions and modifications would be apparent to those skilled in the art. The aim of the appended claims, therefore, is to cover all variations included within the spirit and scope of the invention.

The embodiments of the invention in which an exclusive property or privilege is claimed are defined as follows:

1. In a booster type belt conveyor, a conveyor belt having conveying and return runs trained for orbital movement between driving and return end drums located respectively at head and tail ends of the belt conveyor, one or more intermediate booster belts having driving and return runs trained for orbital movement between driving and return end drums with the driving run of each booster belt in driving engagement with the conveying run, and a drum driving unit including electrical motor means for each driving drum, and improved electrical starting and control system comprising:

engageable and disengageable coupling means in each drum driving unit between the corresponding motor means and driving drum;
 a plurality of control assemblies, one for each drum driving unit;
 means in each control assembly for sensing a running condition of the corresponding motor means and generating a running condition signal in response thereto;
 means for sequentially starting all of said motor means including means for starting a first one of said motor means and automatic means in said control assemblies for starting each of the remainder of said motor means in response to a running condition signal from a previously started motor means;

a coupling-controlling electrical loop common to all of said control assemblies;

a plurality of electrically energizable, coupling-actuating means in the loop, one in each said control assembly, each effective when energized to engage the corresponding coupling means;

means responsive to said running condition signal from the last of said motor means started, to connect said electrical loop to an electrical power source and thereby condition said loop to engage all of said couplings; and a plurality of safety switch means in the loop, one in each said control assembly, each capable of responding to detection of an electrical or mechanical defect associated with the respective drum driving unit and control assembly to open the loop and disconnect all of said coupling-actuating means from the electrical power source, thereby simultaneously stopping said belt conveyor and all said booster conveyors on detection of such defect.

2. In a booster type conveyor, an improved electrical starting and control system according to claim 1 in which a plurality of voltage monitoring means are provided across said loop at intervals therealong for readily locating a defect in said loop.

3. In a booster type belt conveyor, an improved electrical starting and control system according to claim 1, having coupling control switch means in said electrical loop for energizing said coupling-actuating means after the loop has been conditioned by connecting it to said electrical power source.

4. In a booster type belt conveyor, an improved electrical starting and control system according to claim 1 in which:

said electrical power source is an AC power source;

said plurality of coupling-actuating means are DC responsive and not AC responsive; and rectifying means is provided in that portion of said electrical loop associated with the control assembly for the first motor means started, said rectifying means being connected in series with said coupling-actuating means;

whereby a short circuit across said loop deenergizes all of said coupling-actuating means.

5. In a booster type belt conveyor, an improved electrical starting and control system according to claim 4 in which coupling control switch means is provided in that portion of said electrical loop in the control assembly for the first motor means started, said coupling control switch means being connected in series with said coupling-actuating means for energizing said coupling-actuating means after the loop has been conditioned by connecting it to said electrical power source.

6. In a booster type belt conveyor, an improved electrical starting and control system according to claim 1 in which the control assembly for each one of the motor means except the last motor means started comprises:

a motor starting circuit including a relay responsive to a running condition signal from said one motor means to connect an electrical power source to a motor starting relay in the control assembly for the next of said motor means started; and a coupling-engaging circuit including part of said electrical loop and having a relay responsive to electrical energization of said loop to engage the coupling means for said one motor means.

7. In a booster type belt conveyor, an improved electrical starting and control system according to claim 6 having coupling control switch means in said coupling-engaging circuit controlling energization of said electrical loop from said power source.

8. In a booster type belt conveyor, an improved electrical starting and control system according to claim 1 in which the control assembly for the last motor means started comprises:

means to condition said electrical loop for energization including a relay responsive to a running condition signal from said last motor means started to connect an electrical power source to said electrical loop; and a coupling-engaging circuit including part of said electrical loop and having a relay responsive to electrical energization of said loop to engage the coupling means for said last motor means started.

9. In a booster type belt conveyor, an improved electrical starting and control system according to claim 8 having coupling control switch means in said coupling-engaging circuit controlling energization of said electrical loop from said power source.

10. In a booster type belt conveyor, an improved electrical starting and control system according to claim 1 in which the control assembly for the first of said motor means started comprises:

a motor starting circuit including a relay responsive to a running condition signal from said first motor means started to connect an electrical power source to a motor starting relay in the control assembly for the next of said motor means started; and a coupling-engaging circuit including part of said electrical loop and having a relay responsive to electrical energization of said loop to engage the coupling means for said first motor means started.

11. In a booster type belt conveyor, an improved electrical starting and control system according to claim 1 in which the control assembly for each one of said motor means except the first and last to be started comprises:

a motor starting circuit including a relay effective in response to energization from the control assembly of a previously started motor means to start said one motor means, and another relay responsive to a running condition signal from said one motor means to connect a power source to a motor starting relay in the control assembly for the next motor means started; and a coupling-engaging circuit including part of said loop and having a relay responsive to electrical energization of said loop to engage the coupling means for said one motor means.

12. In a booster type belt conveyor, an improved electrical starting and control system according to claim 1 in which the control assembly for the last of said motor means started comprises:

a motor starting circuit including a relay effective in response to energization from the control assembly of the next-to-last-started motor means to start said last motor means and another relay responsive to a running condition signal from said last motor means started to connect an electrical power source to said electrical loop; and a coupling-engaging circuit including part of said loop and having a relay responsive to electrical energization of said loop to engage the coupling means for said last motor means.

13. In a booster type belt conveyor, an improved electrical starting and control system according to claim 1 in which said electrical power source is an AC power source, and said loop comprises two conductors connected across said AC power source at the control assembly for the last motor means started, said conductors being interconnected to close the loop at the control assembly for the first motor means started, and rectifying means in the loop associated with said control assembly for the first motor means started to provide a half wave rectified signal throughout said loop.

14. In a booster type belt conveyor, an improved electrical starting and control system according to claim 13 in which signal monitor means extends between said conductors at spaced intervals for monitoring continuity of said conductors between monitor means.

15. In a booster type belt conveyor, an improved electrical starting and control system according to claim 14 in which each said signal monitor means comprises a voltage detector means.

16. In a booster type belt conveyor, an improved electrical starting and control system according to claim 13 having signal monitor means in parallel with said rectifying means associated with the control assembly for the first motor means started for verifying simultaneous running condition operation of all motor means.

17. In a booster type belt conveyor, an improved electrical starting and control system according to claim 16 having a coupling control switch controlling energization of said loop from said power source and located in said loop in series with said rectifying means and in parallel with said monitor means associated with the control assembly for the first motor means started, whereby said monitor means can verify simultaneous running condition operation of all said motor means before said coupling control switch is actuated to engage said coupling means.

* * * * *

UNITED STATES PATENT AND TRADEMARK OFFICE
CERTIFICATE OF CORRECTION

PATENT NO. : 4,574,943
DATED : March 11, 1986
INVENTOR(S) : Peter J. Green

It is certified that error appears in the above—identified patent and that said Letters Patent is hereby corrected as shown below:

First page of claims, line 10, change "and" (first occurrence) to -- an --.

Signed and Sealed this

Nineteenth Day of August 1986

[SEAL]

Attest:

*Attesting Officer*

DONALD J. QUIGG

*Commissioner of Patents and Trademarks*